US010823240B2

(12) United States Patent
Gou

(10) Patent No.: US 10,823,240 B2
(45) Date of Patent: Nov. 3, 2020

(54) DISC BRAKE, COOLING CONTROL SYSTEM THEREOF, AND VEHICLE

(71) Applicant: BEIQI FOTON MOTOR CO., LTD., Beijing (CN)

(72) Inventor: Zeming Gou, Beijing (CN)

(73) Assignee: BEIQI FOTON MOTOR CO., LTD., Bejing (CN)

( * ) Notice: Subject to any disclaimer, the term of this patent is extended or adjusted under 35 U.S.C. 154(b) by 152 days.

(21) Appl. No.: 15/774,497

(22) PCT Filed: Jul. 25, 2016

(86) PCT No.: PCT/CN2016/091593
§ 371 (c)(1),
(2) Date: May 8, 2018

(87) PCT Pub. No.: WO2017/101444
PCT Pub. Date: Jun. 22, 2017

(65) Prior Publication Data
US 2020/0056670 A1 Feb. 20, 2020

(30) Foreign Application Priority Data
Dec. 18, 2015 (CN) .......................... 2015 1 0958682

(51) Int. Cl.
*F16D 65/12* (2006.01)
*F16D 66/00* (2006.01)
(Continued)

(52) U.S. Cl.
CPC ............ *F16D 65/128* (2013.01); *B60T 1/065* (2013.01); *B60T 17/22* (2013.01); *F16D 65/123* (2013.01);
(Continued)

(58) Field of Classification Search
CPC .. F16D 65/12; F16D 65/128; F16D 2065/132; F16D 2065/1328;
(Continued)

(56) References Cited

U.S. PATENT DOCUMENTS 2,997,312 A * 8/1961 Muller ..................... F16D 55/32
188/264 D
3,481,439 A * 12/1969 Finkin ..................... F16D 65/78
188/264 CC
(Continued)

FOREIGN PATENT DOCUMENTS

CN 1675479 A 9/2005
CN 201833997 U 5/2011
(Continued)

OTHER PUBLICATIONS

State Intellectual Property Office of the P.R. China, International Search Report for corresponding PCT/CN2016/091593, dated Nov. 1, 2016, pp. 1-2.
(Continued)

*Primary Examiner* — Thomas J Williams
(74) *Attorney, Agent, or Firm* — Tucker Ellis LLP

(57) ABSTRACT

A disc brake and a cooling controller, a control system and a control method, a brake disc of the disc brake includes a first basic plate and a second basic plate, jointed and forming a cavity. A fibrous body having a capillary structure is sandwiched between the first basic plate and the second basic plate, the fibrous body filling between the first basic plate and the second plate, and the fibrous body being formed in a ring shape and sleeves on an axle to receive cooling water from the axle and distribute the cooling water on inner walls of the first basic plate and the second basic plate. The cooling water is evenly distributed to prevent brake disc from fading under heat, and based on the disc brake, an additional automatic controlled cooling control (Continued)

system is provided to accurately control the amount of the cooling water, thereby saving water.

12 Claims, 3 Drawing Sheets

(51) Int. Cl.
*B60T 17/22* (2006.01)
*B60T 1/06* (2006.01)
*F16D 65/847* (2006.01)
*F16D 65/02* (2006.01)
*F16D 65/78* (2006.01)

(52) U.S. Cl.
CPC .......... *F16D 65/847* (2013.01); *F16D 66/00* (2013.01); *F16D 2065/132* (2013.01); *F16D 2065/1328* (2013.01); *F16D 2065/783* (2013.01); *F16D 2065/784* (2013.01); *F16D 2065/786* (2013.01); *F16D 2065/787* (2013.01); *F16D 2065/788* (2013.01); *F16D 2066/001* (2013.01)

(58) Field of Classification Search
CPC ......... F16D 2065/783; F16D 2065/784; F16D 2065/786; F16D 2065/788; F16D 2065/001; F16D 66/00; F16D 65/847; B60T 1/065; B60T 17/22
USPC ............. 188/218 XL, 264 R, 264 D, 264 CC
See application file for complete search history.

(56) References Cited

U.S. PATENT DOCUMENTS

| 4,771,822 A * | 9/1988 | Barbosa .................. B60C 23/18 188/71.6 |
| 5,003,829 A * | 4/1991 | DeConti ............... F16D 65/128 188/264 D |
| 2006/0068150 A1 | 3/2006 | Henrich et al. |
| 2008/0121475 A1 | 5/2008 | Bhaskara |
| 2012/0061191 A1 * | 3/2012 | Baumgartner ........ F16D 65/128 188/71.5 |
| 2013/0015023 A1 | 1/2013 | Hassett et al. |

FOREIGN PATENT DOCUMENTS

| CN | 102245924 A | 11/2011 |
| CN | 103542025 A | 1/2014 |
| CN | 104126079 A | 10/2014 |
| CN | 104648371 A | 5/2015 |
| CN | 105508477 A | 4/2016 |
| DE | 4019806 A1 | 1/1992 |
| DE | 102008056161 A1 | 5/2010 |
| DE | 102009026985 A1 | 3/2011 |
| GB | 764366 A | 12/1956 |
| GB | 1289573 | 9/1972 |
| JP | H05215161 A | 8/1993 |

OTHER PUBLICATIONS

EPO, Extended Search Report for corresponding European Application No. 16874505.7, dated Jun. 21, 2019, 7 pages.
SIPO, Office Action for corresponding Chinese application No. CN201510958682.1 dated Jul. 19, 2017, pp. 1-5.

* cited by examiner

DISC BRAKE, COOLING CONTROL SYSTEM THEREOF, AND VEHICLE

RELATED APPLICATION DATA

This application is a national phase application of International Application No. PCT/CN2016/091593 filed Jul. 25, 2016, which claims benefit of Chinese Application No. 201510958682.1 filed Dec. 18, 2015, which are hereby incorporated herein by reference.

FIELD OF THE INVENTION

The present invention relates to the technical field of automobile industry, and in particular to a disc brake, a cooling controller, a cooling control system and a cooling control method thereof and a vehicle.

BACKGROUND OF THE INVENTION

Along with the popularization of vehicles, people have more and more requirements on vehicle handling performance. The promotion and application of disc brakes are becoming more and more widespread. When the vehicles are running at high speeds or driving on rolling roads, the brake discs generate high temperatures due to braking, resulting in heat fading of the brake or other problems.

In the prior art, the main problem existing in the vehicle brake cooling products is that brake discs are subjected to thermal expansion and contraction and vulnerable to fatigue and damage due to uneven water spraying, which may easily result in a waste of cooling water and the damage to the brake discs and brake blocks. If the roads are too undulating, a lot of heat is generated during the brake, causing decline in brake heat and shortage of cooling water, and resulting in brake failure or even causing traffic injuries.

SUMMARY OF THE INVENTION

The first objective of the present invention is to provide a disc brake that can ensure uniform water spraying while cooled by cooling water and prolong the service life of the brake.

The second objective of the present invention is to provide a cooling controller, a cooling control system and a cooling control method of a disc brake. When the disc brake is cooled, the amount of cooling water can be accurately controlled, moreover, uniform water spraying can be guaranteed, and the service life of the disc brake can be prolonged.

Another objective of the present invention is to provide a vehicle. The disc brake of the vehicle can ensure uniform water spraying while cooled by cooling water and can also accurately control the amount of cooling water on the premise of ensuring uniform water spraying.

In order to achieve the above objectives, the present invention provides a disc brake, comprising a brake disc, wherein the brake disc comprises a first basic plate and a second basic plate, which are jointed and forming a cavity. A fibrous body having a capillary structure is sandwiched between the first basic plate and the second basic plate and fills the space between the first basic plate and the second basic plate, and the fibrous body is formed in a ring shape and sleeves on an axle to receive cooling water from the axle and distribute the cooling water on inner walls of the first basic plate and the second basic plate.

Optionally, a spray hole for spraying water to the fibrous body is formed at the junction of the axle and the fibrous body.

Optionally, one spray hole is formed or a plurality of spray holes are arranged around the axle.

Optionally, a spacing net is fixedly connected between the first basic plate and the second basic plate so as to fix the fibrous body in the brake disc.

According to a second aspect of the present invention, a cooling controller of a disc brake is provided, and the cooling controller comprises:

a receiving module used for receiving a temperature signal of the above disc brake;

a judging module used for judging a current water supply mode according to the temperature signal; and a control module used for outputting a control instruction signal for providing necessary cooling water amount for the disc brake.

Optionally, the controller further comprises: a database storing temperature data and cooling water amount data corresponding to the temperature data, and the judging module calculates the current necessary cooling water amount by querying the database.

According to a third aspect of the present invention, a cooling control system of a disc brake is provided, and the cooling control system comprises:

a disc brake, wherein the disc brake is the above-mentioned disc brake;

a temperature detection device used for detecting the current temperature of the disc brake;

a cooling controller, wherein the cooling controller is the above cooling controller, and the receiving module is electrically connected with the temperature detection device; and a water supply mechanism, wherein the water supply mechanism is electrically connected with the control module for receiving the control instruction signal of the control module and supplying water to the disc brake.

Optionally, the temperature detection device is a temperature sensor.

Optionally, the water supply mechanism comprises a water tank, a water pump and a waterway, which are connected in sequence, and the waterway at least partially extends along the axle to point to the fibrous body.

According to a fourth aspect of the present invention, a cooling control method of a disc brake is provided, and the cooling control method comprises:

a collection step: collecting a temperature signal of the above disc brake;

a judging step: judging current necessary cooling water amount of the disc brake according to the temperature signal; and a control step: providing necessary cooling water to the disc brake.

According to a fifth aspect of the present invention, a vehicle is provided, comprising the above disc brake or the cooling control system of the above disc brake.

By the adoption of the above technical solutions, as the brake disc of the disc brake is filled with the fibrous body, when the braking system is cooled, the cooling water sprayed into the fibrous body is evenly distributed on the inner walls of the first basic plate and the second basic plate by means of the capillary principle, thereby ensuring uniform water spraying and prolonging the service life of the brake. In addition, on the basis of the application of the disc brake, the amount of the cooling water can be accurately controlled via the automatic control type cooling control system, thereby saving water.

Other features and advantages of the present invention will be described in detail in the following detailed description.

BRIEF DESCRIPTION OF THE DRAWINGS

The drawings are used for providing a further understanding of the present invention, constitute a part of the specification, used for explaining the present invention together with the following specific embodiments, but are not intended to limit the present invention. In the drawings.

DETAILED DESCRIPTION OF THE EMBODIMENTS

The specific embodiments of the present invention are described in detail below in combination with the drawings. It should be understood that, the specific embodiments described herein are only used for describing and explaining the present invention, rather than limiting the present invention.

In the present invention, unless specifically stated to the contrary, directional terms such as "inside" and "outside" are used with respect to the three-dimensional contour of the brake disc, and the cavity between the first basic plate and the second basic plate is the interior of the brake disc.

Figure 1:
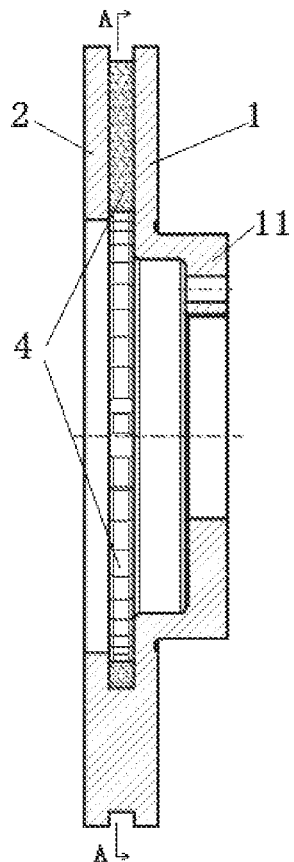
FIG. 1 is a side face sectional view of a brake disc according to an embodiment of the present invention.
Figure 2:
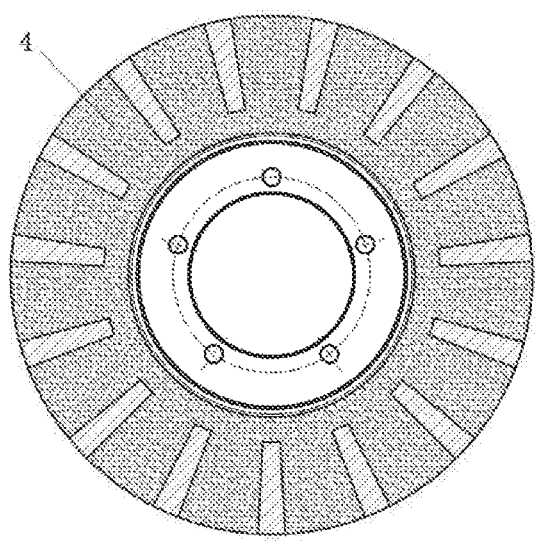
FIG. 2 is a sectional view along an A-A line in FIG. 1.
Figure 4:
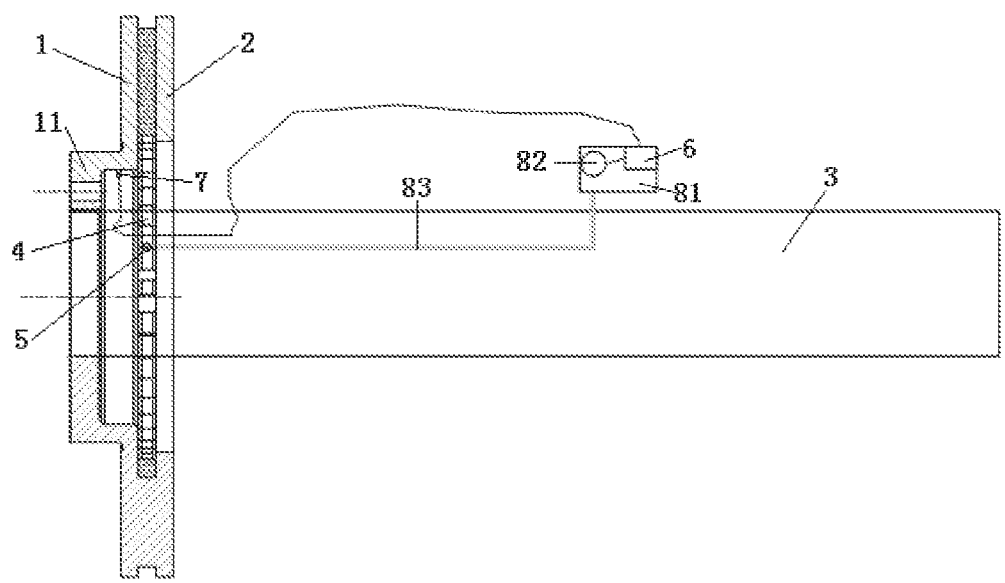
FIG. 4 is a schematic diagram of a mounting structure of a cooling control system according to an embodiment of the present invention.

FIG. 1 and FIG. 2 show a brake disc of a disc brake provided by the present invention. The brake disc comprises a first basic plate 1 and a second basic plate 2, which are jointed and forming a cavity. A fibrous body 4 having a capillary structure is sandwiched between the first basic plate 1 and the second basic plate 2. The fibrous body 4 fills between the first basic plate 1 and the second basic plate 2 and is formed in a ring shape and sleeves on an axle 3 to receive cooling water from the axle 3 and distribute the cooling water on the inner walls of the first basic plate 1 and the second basic plate 2. In the present embodiment, as shown in FIG. 1 and FIG. 4, the first basic plate 1 protrudes outward along the axial direction to form a projection 11 used for sleeving the brake disc on the axle 3, wherein the fibrous body 4 refers to substance composed of continuous or discontinuous filaments, and thus having capillary tissues. It will be understood by those skilled in the art that the liquid will be more evenly distributed in the fibrous body due to the capillary action principle. The present invention applies the capillary principle innovatively, that is, when disc brake is cooled, the cooling water is sprayed to the brake disc, and the cooling water is distributed more evenly in the fibrous body 4, so that the heat is effectively dissipated on the inner walls of the first basic plate 1 and the second basic plate 2 to prevent the burst of the brake disc due to the uneven heating and cooling, and thus the service life of the brake is prolonged.

Preferably, as shown in FIG. 4, a spray hole 5 for spraying water to the fibrous body 4 is formed at the junction of the axle 3 and the fibrous body 4, in order to spray the cooling water to one end of the fibrous body 4 close to the circle centre via the spray hole 5, in this way, the water flow sprayed from the spray hole 5 is sprayed to one end of the fibrous body 4 close to the axial line of the brake disc in the inner cavity of the brake disc. The water flow is in contact with the fibrous body 4 on the spray point, and the cooling water flows to the edge of the brake disc due to the centrifugal force during the rotation of the brake disc, and the cooling water is evenly distributed on the inner walls of the first basic plate 1 and the second basic plate 2 depending on the capillary action principle, so that the heat fading of the brake disc can be effectively prevented, meanwhile the cooling water cools the interior of the brake disc and does not touch a friction block, and thus the water fading can be prevented.

Specifically, one spray hole 5 is formed or a plurality of spray holes are arranged around the axle 3. Preferably, a plurality of spray holes 5 can be evenly arranged around the axle 3. When the vehicle speed is high, the brake disc rotates quickly, and only one spray hole 5 can satisfy the requirements of uniform water spraying, and when the vehicle speed is low, for example, during driving on rugged mountain roads, the plurality of spray holes 5 can be formed to further promote the uniform dispersion of the cooling water.

Preferably, the fibrous body 4 is ceramic fiber. The ceramic fiber is a lightweight refractory material, which has the advantages of light weight, high temperature resistance, good heat stability, low heat conductivity, small specific heat, mechanical vibration resistance and the like, and is particularly suitable for serving as the necessary fibrous body in the present invention, in other embodiments, other high temperature resistant fibers close to the performance of the ceramic fiber can also be adopted, for example, carbon fiber or basalt fiber or the like. Further, a spacing net is fixedly connected between the first basic plate 1 and the second basic plate 2 so as to fix the fibrous body 4 in the brake disc. The netty structure can avoid unnecessary weight increase of the brake disc, specifically, the spacing net can be welded in the inner cavity of the brake disc by using a stainless steel net, which has the advantages of simple structure, convenient maintenance and the like.

Figure 3:
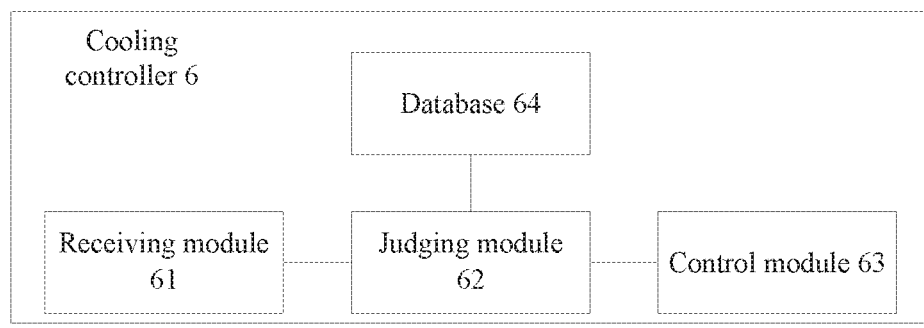
FIG. 3 is a structural block diagram of a cooling controller according to an embodiment of the present invention.

FIG. 3 shows a structural block diagram of a cooling controller of the disc brake provided by an embodiment of the present invention. As shown in FIG. 3, the cooling controller 6 comprises: a receiving module 61 used for receiving a temperature signal of the above disc brake; a judging module 62 used for judging a current water supply mode according to the temperature signal; and a control module 63 used for outputting a control instruction signal for providing necessary cooling water amount to the disc brake. Preferably, the temperature signal indicates a temperature on the brake disc. The water supply mode comprises whether to supply water and different modes corresponding to different water amounts during water supply, and thus whether to spray water to the brake disc and the necessary water spraying amount can be automatically controlled according to the current temperature of the brake disc.

Specifically, the cooling controller 6 further comprises a database 64. The database 64 stores temperature data and cooling water amount data corresponding to the temperature data, and the judging module 62 calculates the current necessary cooling water amount by querying the database 64. The temperature data and the cooling water amount data in the database can be demarcated by those skilled in the art via experiments, wherein the smaller the interval of the temperature data is, the more precise the control of the cooling water amount data is. The temperature data can comprise a temperature threshold corresponding to a zero water supply amount, namely, water supply stop, and thus whether to spray water to the brake disc and the necessary water spraying amount can be automatically controlled according to the change of the temperature value.

In addition, in some embodiments, beside the database, a first temperature threshold and a second temperature threshold can be preset in the cooling controller. In the embodiment, the temperature data corresponding to the zero water supply amount may not be set in the database, and whether to supply the water is firstly judged according to a preset temperature threshold. When the judging module 62 judges that the temperature signal received by the receiving module 61 at present is higher than the first temperature threshold, the judging module 62 can judge that the cooling controller 6 is in a high temperature working condition at present, at this time, the judging module 62 further calculates the current cooling water amount after querying the database 64 and drives the control module 63 to output a water spraying instruction, wherein the water spraying instructions are different according to different cooling water amounts; and if the judging module 62 judges that the temperature signal received by the receiving module 61 at present is lower than the second temperature threshold, the judging module 62 can judge that the cooling controller 6 is in a low temperature working condition at present, at this time, the judging module can directly send a water spraying stop instruction via, the control module 63 without querying the database.

The second temperature threshold can be the same as the first temperature threshold, namely, whether the database needs to be queried can be judged just by comparing the temperature threshold with the current temperature value. In addition, the second temperature threshold can also be smaller than the first temperature threshold, at this time, when the temperature signal received by the receiving module 61 is between the first temperature threshold and the second temperature threshold, the cooling controller 6 is in a standby working condition, and the control module 63 does not work, namely, sends no instructions.

It should be noted herein that when the first temperature threshold is higher than the second temperature threshold and when the temperature signal received by the receiving module 61 is between the first temperature threshold and the second temperature threshold, the judging module 62 cannot determine the change trend of the temperature signal in the standby working condition, so that the judging module sends no instructions temporarily and waits for the further change of the temperature, and thus water can be effectively saved. It should also be noted that when the cooling controller 6 is in the standby working condition, the temperature of the brake disc is also within a safe range of heat fading, that is, the temperature does not cause the heat fading of the brake disc.

Figure 5:
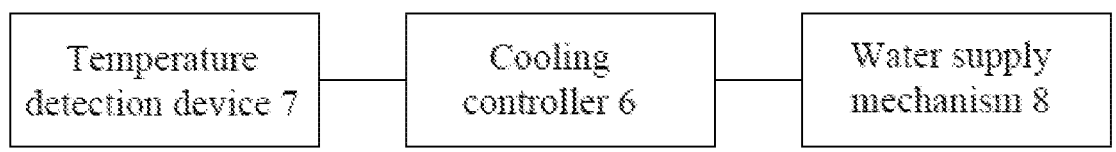
FIG. 5 is a structural block diagram of a cooling control system according to an embodiment of the present invention.

FIG. 5 shows a structural block diagram of a cooling control system of the disc brake provided by an embodiment of the present invention. As shown in FIG. 5, the cooling control system comprises:

a disc brake, wherein the disc brake is the above-mentioned disc brake;

a temperature detection device 7 used for detecting the current temperature of the disc brake;

a cooling controller 6, wherein the cooling controller 6 is the above cooling controller 6, and the receiving module 61 is electrically connected with the temperature detection device 7; and a water supply mechanism 8, wherein the water supply mechanism 8 is electrically connected with the control module 63 for receiving the control instruction signal of the control module 63 and supplying water to the disc brake. Therefore, the cooling water can be accurately and automatically sprayed to the disc brake via electronic control so as to effectively save water. Preferably, the current temperature of the brake disc serves as the current temperature of the disc brake.

Specifically, the temperature detection device 7 can be a temperature sensor, which is electrically connected with the receiving module 61 in the cooling controller 6 to transmit the temperature signal. A probe of the temperature sensor is arranged in the inner cavity of the disc brake, and specifically, the probe can be in contact with the inner wall of the first basic plate 1 or the second basic plate 2. In other embodiments, a plurality of temperature sensors can also be provided for respectively detecting the temperatures of various positions of the disc brake, and after the receiving module 61 receives a plurality of temperature signals, the judging module 62 comprehensively judges the amount of cooling water by integrating the temperatures of the various positions.

Specifically, the water supply mechanism 8 can comprise a water tank 81, a water pump 82 and a waterway 83, which are connected in sequence, and the waterway 83 at least partially extends along the axle 3 to point to the fibrous body 4. Preferably, a spray hole 5 for spraying water to the fibrous body 4 is formed at the junction of the axle 3 and the fibrous body 4, in order to spray the cooling water to one end of the fibrous body 4 close to the circle centre via the spray hole 5, and the water outlet of the waterway 83 points to the above spray hole 5, so that the cooling water can be evenly distributed on the inner walls of the first basic plate 1 and the second basic plate 2 depending on the capillary action principle and the centrifugal force principle.

Further, a liquid level detection device can be arranged on the water tank 81 with an alarm switch arranged. The alarm switch can be electrically connected to the cab to remind the driver of the use condition of the cooling water in the water tank 81.

Figure 6:
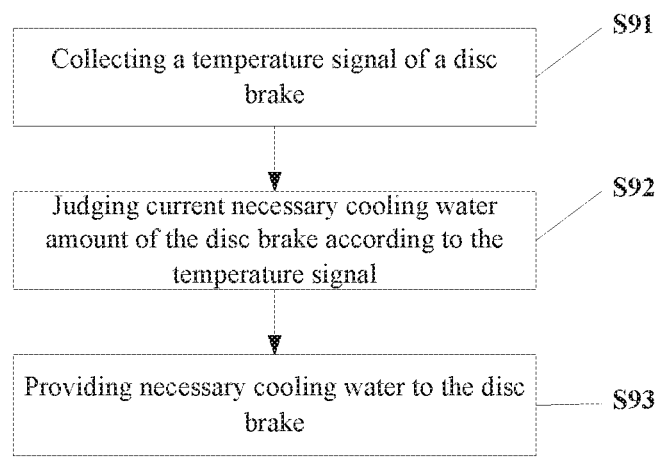
FIG. 6 is a flowchart of a cooling control method according to an embodiment of the present invention.

FIG. 6 shows a flowchart of a cooling control method of the disc brake provided by an embodiment of the present invention. As shown in FIG. 6, the cooling control method can comprise: a collection step S91: collecting a temperature signal of the above disc brake; a judging step S92: judging current necessary cooling water amount of the disc brake according to the temperature signal; and a control step S93: providing necessary cooling water to the disc brake. Specifically, in the embodiment mentioned above, the water amount can be effectively controlled by performing real-time comparison by querying the database.

In other embodiments, primary judgment can be performed via the preset threshold. Specifically, when the temperature signal is higher than the first threshold, the cooling water is sprayed to the disc brake in a first control mode, and the amount of the cooling water changes with the temperature signal in the first control mode; when the temperature signal is reduced to be lower than the first threshold and is higher than a second threshold, the first control mode is quitted, a second control mode is executed to wait for the temperature change; and when the temperature is further reduced to be lower than the second threshold, the second control mode is quitted, a third control mode is executed, the cooling water is stopped from being sprayed to the disc brake, that is, the amount of the cooling water is zero.

In another embodiment, the first temperature threshold is the same as the second temperature threshold, and the temperature signal is compared with the same temperature threshold in the judging step S92 to judge the current necessary water supply amount, wherein the water supply amount can comprise zero water supply. In the embodiment, the cooling control system has relatively high instantaneity.

In addition, it should be noted that the vehicle using the above disc brake described above or the cooling control system of the above disc brake should also fall within the protection scope of the present invention.

Although the preferred embodiments of the present invention have been described in detail above in combination with the drawings, the present invention is not limited to the specific details of the above embodiments, various simple modifications may be made to the technical solutions of the present invention within the scope of the technical concept of the present invention, and these simple variations belong to the protection scope of the present invention. In addition, it should be noted that the specific technical features described in the foregoing specific embodiments may be combined in any suitable manner without contradiction. In order to avoid unnecessary repetition, various possible combination modes are not described separately in the present invention.

In addition, any combination of various embodiments of the present invention may also be adopted as long as it does not violate the spirit of the present invention, and should also be regarded as the contents disclose by the present invention.

The invention claimed is:

1. A cooling control system of a disc brake, wherein the cooling control system comprises:
   a brake disc, wherein the brake disc comprises a first basic plate and a second basic plate, which are jointed and forming a cavity, and a fibrous body having a capillary structure is sandwiched between the first basic plate and the second basic plate and fills the space between the first basic plate and the second basic plate, and the fibrous body is formed in a ring shape and sleeves on an axle to receive cooling water from the axle and distribute the cooling water on inner walls of the first basic plate and the second basic plate;
   a temperature detection device used for detecting the current temperature of the disc brake;
   a cooling controller, wherein the cooling controller comprises:
      a receiving module used for receiving a temperature signal of the disc brake;
      a judging module used for judging a current water supply mode according to the temperature signal; and
      a control module used for outputting a control instruction signal for providing necessary cooling water amount to the disc brake, and the receiving module is electrically connected with the temperature detection device; and
   a water supply mechanism, wherein the water supply mechanism is electrically connected with the control module for receiving the control instruction signal of the control module and supplying water to the disc brake,
   wherein the controller further comprises a database storing temperature data and cooling water amount data corresponding to the temperature data, and the judging module calculates the current necessary cooling water amount by querying the database.

2. The cooling control system of the disc brake of claim 1, wherein the temperature detection device is a temperature sensor.

3. The cooling control system of the disc brake of claim 1, wherein the water supply mechanism comprises a water tank, a water pump and a waterway, which are connected in sequence, and the waterway at least partially extends along the axle to point to the fibrous body.

4. The cooling control system of the disc brake of claim 3, wherein a spacing net is fixedly connected between the first basic plate and the second basic plate so as to fix the fibrous body in the brake disc.

5. The cooling control system of the disc brake of claim 4, wherein the temperature detection device is a temperature sensor.

6. The cooling control system of the disc brake of claim 1, wherein a spacing net is fixedly connected between the first basic plate and the second basic plate so as to fix the fibrous body in the brake disc.

7. A vehicle, wherein the vehicle comprises a disc brake comprising a brake disc, wherein the brake disc comprises a first basic plate and a second basic plate, which are jointed and forming a cavity, and a fibrous body having a capillary structure is sandwiched between the first basic plate and the second basic plate and fills the space between the first basic plate and the second basic plate, and the fibrous body is formed in a ring shape and sleeves on an axle to receive cooling water from the axle and distribute the cooling water on inner walls of the first basic plate and the second basic plate,
   wherein, the vehicle further comprises:
   a temperature detection device used for detecting the current temperature of the disc brake;
   a cooling controller, wherein the cooling controller comprises:
      a receiving module used for receiving a temperature signal of the disc brake;
      a judging module used for judging a current water supply mode according to the temperature signal; and
      a control module used for outputting a control instruction signal for providing necessary cooling water amount to the disc brake, and the receiving module is electrically connected with the temperature detection device; and
   a water supply mechanism, wherein the water supply mechanism is electrically connected with the control module for receiving the control instruction signal of the control module and supplying water to the disc brake,
   wherein the controller further comprises a database storing temperature data and cooling water amount data corresponding to the temperature data, and the judging module calculates the current necessary cooling water amount by querying the database.

8. The vehicle of claim 7, wherein a spacing net is fixedly connected between the first basic plate and the second basic plate so as to fix the fibrous body in the brake disc.

9. The vehicle of claim 7, wherein a spray hole for spraying water to the fibrous body is formed at the junction of the axle and the fibrous body.

10. The vehicle of claim 9, wherein one spray hole is formed or a plurality of spray holes are arranged around the axle.

11. The vehicle of claim 10, wherein a spacing net is fixedly connected between the first basic plate and the second basic plate so as to fix the fibrous body in the brake disc.

12. The vehicle of claim 7, wherein the water supply mechanism comprises a water tank, a water pump and a waterway, which are connected in sequence, and the waterway at least partially extends along the axle to point to the fibrous body.

* * * * *